US007018191B2

(12) United States Patent
Harris

(10) Patent No.: US 7,018,191 B2
(45) Date of Patent: Mar. 28, 2006

(54) PLASTICS EXTRUDER DIMENSION AND VISCOSITY CONTROL SYSTEM

(75) Inventor: Holton E. Harris, Westport, CT (US)

(73) Assignee: Harrel Incorporated, East Norwalk, CT (US)

( * ) Notice: Subject to any disclaimer, the term of this patent is extended or adjusted under 35 U.S.C. 154(b) by 334 days.

(21) Appl. No.: 10/640,857

(22) Filed: Aug. 13, 2003

(65) Prior Publication Data

US 2004/0032040 A1 Feb. 19, 2004

Related U.S. Application Data

(60) Provisional application No. 60/403,501, filed on Aug. 13, 2002.

(51) Int. Cl.
*B29B 7/72* (2006.01)

(52) U.S. Cl. ...................... 425/144; 425/145; 425/149; 425/377; 425/378.1; 264/40.1; 264/40.4; 264/40.6; 264/40.7

(58) Field of Classification Search ................ 425/144, 425/145, 149, 377, 378.1; 264/40.1, 40.4, 264/40.6, 40.7
See application file for complete search history.

(56) References Cited

U.S. PATENT DOCUMENTS 4,209,476 A 6/1980 Harris
4,272,466 A 6/1981 Harris
4,290,986 A * 9/1981 Koschmann ............... 264/40.3
4,448,736 A * 5/1984 Emery et al. .............. 264/40.1
4,721,589 A 1/1988 Harris
4,734,922 A 3/1988 Harris
4,954,719 A 9/1990 Harris
5,695,789 A 12/1997 Harris
5,718,852 A * 2/1998 Campbell et al. .......... 264/40.1
5,725,814 A 3/1998 Harris
6,652,785 B1 11/2003 Harris
6,719,935 B1 * 4/2004 Tunc ......................... 264/40.7

OTHER PUBLICATIONS

Harrel Incorporated,"Viscosity Control in Extrusion . . . The Viscontrol Process", TDS-298.
Harrel Incorporated, The VT-60.0 Viscotruder, TDS-297.
Harrel Incorporated, "The Care and Feeding of Polyurethane Extrusion Lines".

* cited by examiner

*Primary Examiner*—Joseph S. Del Sole
(74) *Attorney, Agent, or Firm*—Gallagher & Kennedy, P.A.; Thomas D. MacBlain

(57) ABSTRACT

An extrusion control system that controls the cross section and viscosity during extrusion of even hard to control plastics like polyurethane. Cross section, A, is determined by measuring volumetric rate of deliver of melt through a gear pump V/t and the speed of the extrudate at a puller N/t. The cross-section area, A=(V/t)/(N/t), is controlled by controlling the puller speed. Pressure drop across the die, P, and the volume of melt delivered by the gear pump are measured and a term indicative of the viscosity of the melt is determined based on Vs=(KP)/V, Vs being the viscosity and K being a constant dependent on the size and shape of the die orifice. Viscosity variations are compensated by varying heat applied to the melt.

20 Claims, 1 Drawing Sheet

Controller
10
36
Encoder
Motor
34
26
40
38
38
38
39
28
28
28
39
Encoder
Motor
46
22
24
39
Extruder
39
39
29
Fan
12
42
44
Gear Pump
14
45
30
16
33 Encoder
32
Motor
Thickness Gauge
47
Bath
18
Puller
20

PLASTICS EXTRUDER DIMENSION AND VISCOSITY CONTROL SYSTEM

RELATED APPLICATIONS

This application claims priority from the provisional patent application Ser. No. 60/403,501 filed Aug. 13, 2002 in the name of Holton E. Harris entitled "Plastics Extruder Dimension and Viscosity Control System and Method" incorporated herein by reference.

FIELD OF THE INVENTION

This invention relates to control systems and methods for plastics extruders, and more particularly to such systems and methods in which dimensions and viscosity are automatically continuously controlled.

BACKGROUND OF THE INVENTION

The extrusion of polyurethane plastic is difficult. Polyurethane has many unique and desirable characteristics, and it is the polymer of choice for many applications. Unfortunately, polyurethane has one really serious drawback from an extrusion standpoint—it is highly variable. As remarked in the paper entitled *Viscosity Control in Extrusion . . . The Viscontrol Process,* TDS -298, Harrel, Incorporated, incorporated herein by reference and which is attached to the above-identified U.S. provisional application, most polymers will vary in characteristics from lot to lot, but polyurethane characteristics can vary several times in a 50-lb. sack.

Trying to extrude polyurethane on a conventional, manually controlled extruder is an exercise in frustration. Every time the polymer characteristics change, the operator has to readjust the extruder to compensate. Either that or the operator must accept the resulting changes in the dimensions of the extrudate.

For a number of years Harrel, Incorporated's TUBETROL system has been a solution to the problem of extruding polyurethane. The TUBETROL system uses a melt pump, and one of the characteristics of the melt pump is that, when properly controlled, it is capable of holding the throughput steady to 0.1% stability or so. This makes for better tubing and a considerably lower level of operator frustration.

U.S. Pat. No. 4,209,476, issued Jun. 24, 1980, entitled "Method and Apparatus for Fabrication of Extruded Articles" in the name of Holton E. Harris and assigned to the assignee of the present invention, Harrel, Incorporated, describes Harrel's TUBETROL process. It is incorporated herein by reference. In addition to a generalized explanation of maintaining cross-section dimensions of an extrudate, examples are given of the use of the system to maintain diameter of an extruded rod, thickness of an extruded sheet and inside and outside diameter, hence thickness, of an extruded tube.

Using TUBETROL to extrude urethane, operators still must manually adjust the temperatures of the barrel to adjust the viscosity of the polymer. There is a need, therefore, for an extruder control that adds viscosity control to the standard TUBETROL system. This would add a new dimension of control to the TUBETROL system, and make it into an entirely different and more capable system.

The paper, identified above, describes the viscosity control system of Harrel, Incorporated called VISCONTROL. U.S. Pat. No. 4,721,589 entitled "Extruder Viscosity Control System and Method" issued Jun. 26, 1988 to Holton E.

Harris, assigned to Harrel, Incorporated, the assignee of the present invention, also describes the Harrel viscosity control system. This patent is incorporated herein by reference.

Harrel's VISCONTROL system as described in the paper and patent has never been incorporated in a Harrel TUBETROL system. Consequently, automatic viscosity control such as would benefit the extrusion of polyurethane under the dimensional control of a TUBETROL system has not previously been accomplished.

BRIEF SUMMARY OF THE INVENTION

In accordance with this invention, a system and method of plastics extruder control automatically corrects for extrudate dimension and viscosity of melt as it passes the die of the extruder.

In one preferred embodiment, the system and method compensate for variations in the viscosity-affecting characteristics of the plastic fed into the extruder to hold the viscosity of the melt at the die substantially constant while a cross section dimension or cross section area is held substantially constant. In the case of tubular extrudates inside and outside diameter are maintained within desired tolerances. In one embodiment, the system and method compensates for the variations in characteristics encountered when extruding polyurethane.

In a particular preferred embodiment, one or more controllers is associated with an extruder having a gear pump (sometimes referred to as a "melt pump") just upstream of the die. The amount of melt being extruded is very closely proportional to the speed at which the pump is driven. The rate of melt through the pump is V/t, where V is volume and t is time. A line speed counter can determine the linear rate (N/t) at which extrudate is produced. Knowing volume and length in a given time, cross-sectional area is readily determined. I.e., $$A = \frac{V/t}{N/t}.$$

In the case of tubing, the outside diameter of the tubular extrudate is measured. From this and the cross-sectional area, calculated as described, the inside diameter of the tube can be determined. A controller adjusts gear pump speed and/or puller speed as needed to hold the cross-sectional area relatively constant. Viscosity is controlled, by the same or another controller. The controller controls viscosity by measuring the pressure drop across the die and the quantity of plastic being pumped by the gear pump. The volume, V, of melt being pumped is V=KP/Vs, where K is a constant dependent on the size and shape of the die orifice, P is the pressure drop across a fixed orifice (here, the die) and Vs is viscosity. Knowing just P, and V, a measure proportional to and thus that is indicative of viscosity, e.g. Vs/K, can be determined. A satisfactory viscosity Vs can be kept constant. The heat introduced to the melt in the extruder can be adjusted to hold viscosity relatively constant as reflected in melt pressure across the die. Holding cross-sectional dimensions and viscosity constant permits the extrusion of a satisfactory product using even difficult to control plastics such as polyurethane. (It should be noted that in the above-referenced writing, TDS-298, the volume V is referred to as the "quantity" of melt being pumped and is designated "Q.")

Pressure of the melt at the die, just upstream of the die is indicative of the pressure drop across the die since the pressure downstream of the die remains, for these purposes, constant at substantially one atmosphere. As used herein, then, "measuring the pressure drop across the die" can mean measuring just the pressure at the input to the die, knowing that at the output from the die the pressure is one atmosphere, and calculating the pressure drop P by subtracting the known output side pressure from the measured pressure upstream of the die.

The above and further objects and advantages of the invention will be better understood from the following detailed description of at least one preferred embodiment of the invention, taken in consideration with the accompanying drawing.

DETAILED DESCRIPTION OF PREFERRED EMBODIMENT

Figure 1:
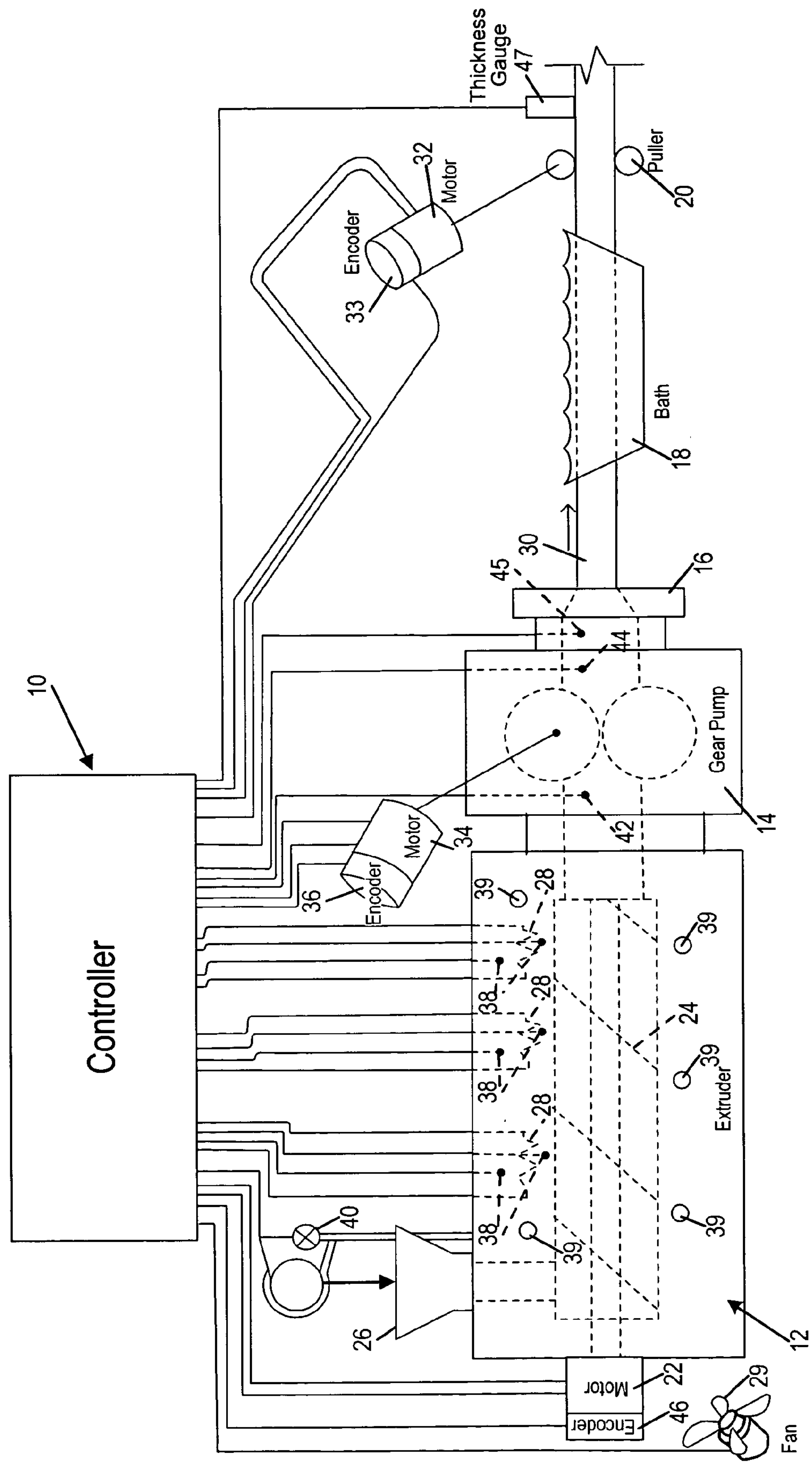
FIG. 1 is a simplified diagrammatic illustration, in block diagram form, of a control system and extruder in accordance with the present invention.

In FIG. 1 a controller 10 is shown in controlling relation to the various features of a plastics extrusion line that includes an extruder 12, a gear pump 14, a die 16, a water bath 18 and a puller 20. These are all known features of an extrusion line. FIG. 1 is a functional block diagram that is simplified for purposes of explanation of the inventive concepts described here. Not shown in FIG. 1 are, for example, such known-in-the-art features of an extruder installation as suitably chosen commercially available power modules that, under the control of a commercially available controller, supply the motors 22, 34 and 32 that drive the extruder screw 24, the gear pump 14 and the puller 20 and that supply current to the extruder heaters 28. A suitable, commercially available controller for the purposes described here is the CP-873 or CP-874 Digipanel controller available from Harrel, Incorporated, East Norwalk, Conn. The motor 22 drives the screw 24 that moves plastic, introduced as, for example, pellets at an input hopper 26. Frictional heat of the turning screw 24 and, if needed, heat from the series of electrical heaters 28 (Calrods, for example) turn the solid plastic pellets into a hot viscous plastic mass (called "melt"), as the plastic moves downstream to the right in FIG. 1. As a further component of heat control, the extruder 12 may have air cooling, as is commonplace, and as is indicated by the fan 29 under control of the controller 10. Alternatively or in addition to the air cooling, coolant flow through paths 39 may be used to reduce the heat being transferred to the melt under control of the controller 10 and, e.g., a controller valve 40.

The gear pump 14 forces a precisely metered quantity of the melt through the die 16 to form the extrudate 30. The extrudate 30 is pulled through the water bath 18 by the puller 20. A motor 32 drives the puller 20 under control of the controller 10. An encoder 33 measures the speed of the extrudate by measuring the speed at which the motor is driving the puller. This information is sent to the controller 10.

Other information that is sent to the controller 10 includes the speed at which a motor drives the gear pump 14. This is sent to the controller 10 by an encoder 36, for example. Temperatures at heat zones along the extruder are measured by sensors 38 and are sent to the controller 10. Pressures just upstream and downstream of the gears of the gear pump 14 are measured by pressure sensors 42 and 44, respectively, and sent to the controller. Pressure just upstream of the die orifice is measured and sent to the controller by a pressure sensor 45. Screw speed is imparted to the controller by an encoder 46. Particularly in the case of the extrusion of tubing, a suitably chosen thickness (or width) gauge 47 sends to the controller 10 a cross-sectional dimension measurement. In the case of tubing this is the outside diameter $D_1$.

The controller 10 controls the heaters 28, cooling by the coolant in paths 39, the speed imparted to the screw 24 by the motor 22, the gear pump speed (and hence throughput) and the puller speed. The temperature in the zones of the extruder may be controlled as described in U.S. Pat. No. 4,272,466, incorporated herein by reference, issued Jun. 9, 1981, in the name of Holton E. Harris, assigned to the assignee of the present invention and entitled "System and Method of Temperature Control for Plastics Extruder," except that, when for the purpose of viscosity control greater or lesser introduction of heat is required, heater zone set points (to which sensed temperatures are compared to derive a corrective signal) are modified appropriately to achieve the needed heating.

To decrease viscosity, additional heat is introduced. To increase viscosity, heat is reduced. In addition to use of the heaters 28, heat in the extruder can be varied by varying the speed of the screw and by increasing and reducing coolant flow in the paths 39. Care must be taken not to starve the gear pump 14 or excessively increase the pressure upstream of the gear pump. Pressure across the gear pump, or at least pressure at the input to the gear pump is monitored to this end.

Puller speed is typically adjusted under control of the controller as one measure of controlling cross-sectional area (or dimensions). When the controller 10 determines that the cross-sectional area of the extrudate has changed as measured by the encoder 33, the controller 10 can effect a change in dimension by altering the speed of the puller motor 32 and/or the gear pump motor 34. This is done in the manner described in the previously referenced U.S. Pat. No. 4,209,476, for example, and using the formula $$Vs = \frac{KP}{V}.$$

The controller 10 determines a viscosity indicative measure that is proportional to viscosity (Vs) from (a) a measurement of the throughput (V) of the pump 14, as determined by the output from the encoder 36, and (b) a measurement of the pressure (P) by the pressure sensor 45. The constant K which depends on the size and shape of the die orifice, and will not change during the course of an extrusion operation, is ordinarily unknown. By determining that a suitable product is being extruded, the value of P/V, equal to Vs/K, is determined and maintained substantially constant, knowing that an acceptable viscosity has been achieved. This is done as described above and in the previously referenced U.S. Pat. No. 4,721,589. When required, as determined by the controller 10, more or less heat is introduced into the melt by the controller, by increasing or decreasing screw speed, by raising or lowering the temperature in the heating zones by control of the current through the electrical heaters 28, or by controlling the flow of cooling air on fluid to the extruder.

The foregoing descriptions of at least one preferred embodiment are exemplary and not intended to limit the claimed invention. Obvious modifications that do not depart from the spirit and scope of the invention as claimed will be apparent to those skilled in the art. For example, as an equivalent alternative to the encoder 33 that reports the speed of the motor 32 to the controller 10, an extrudate speed monitoring gauge with a roller that directly contacts the extrudate can be used. As with the encoder 33 of FIG. 1, such a gauge has an output that is indicative of extrudate speed and that the controller 10, again, is programmed to use to calculate cross-sectional area.

I claim:

1. An extrusion system comprising:

(a) an extruder having a screw for moving plastic internally toward an end thereof, (b) a screw motor connected in driving relation to the screw, (c) a gear pump connected to the extruder to receive hot viscous plastic delivered thereto by the extruder, (d) a gear pump motor connected in driving relation to the gear pump to move the hot viscous plastic therethrough, (e) a die downstream of the gear pump for receiving hot viscous plastic moved through the gear pump to form an extrudate, (f) a puller for pulling the extrudate away from the die, (g) a puller motor connected in driving relation to the puller, (h) a controller connected in controlling relation to the screw motor, the gear pump motor and the puller motor to control the speeds of the screw, the gear pump and the puller, (i) a speed sensor operative to generate an electrical output indicative of the speed of the extrudate, the electrical output indicative of the speed of the extrudate being connected as an input to the controller, (j) a gear pump speed encoder operatively connected to the gear pump to generate an electrical output indicative of the volume per unit of time of hot viscous plastic being forced through the die, the electrical output indicative of the volume per unit time being connected as an input to the controller, (k) a screw speed encoder operatively connected to the screw to generate an electrical output indicative of the speed of the screw, the electrical output indicative of the speed of the screw being connected as an input to the controller, (l) the extruder having at least one heater for imparting heat to the plastic being moved by the screw, the controller being connected in controlling relation to the at least one heater to control the amount of heat being imparted by the heater to the plastic being moved by the screw, (m) a temperature sensor located to sense the temperature of the extruder where heat is being introduced to plastic being moved through the heater, (n) a pressure sensor located upstream and proximate the die in the path of flow of the hot viscous plastic to the die and having an electrical output indicative of pressure there connected as an input to the controller, (o) the controller being programmed to increase and decrease at least one of the gear pump speed and the speed of the puller motor, the puller and the extrudate in response to a change in the cross-sectional area of the extrudate derived from an indication of the speed of the gear pump delivered to the controller by the gear pump encoder and an indication of the speed of the extrudate delivered to the controller by the puller encoder, and (p) the controller being programmed to increase and decrease the temperature of the viscous plastic in the extruder to maintain the viscosity of the viscous plastic in the extruder in response to a detected change in viscosity as indicated by a change in pressure in the hot viscous plastic by the pressure sensor upstream of and proximate the die.

2. The extrusion system according to claim 1, wherein the controller is operative to calculate, from the puller encoder output indicative of speed N/t of the extrudate, and the gear pump encoder indicative of volume per unit time V/t of hot viscous plastic being pumped, the cross-sectional area of the extrudate A, per the formula $$A = \frac{V/t}{N/t},$$

and the controller is operative to calculate, from the volume V of hot viscous plastic being pumped by the gear pump, and the pressure drop P across the die, a term proportional to the viscosity Vs of the hot viscous plastic at the die, per the formula $$Vs = \frac{KP}{V},$$

where K is a constant.

3. The extrusion system according to claim 2, wherein the controller is operative to increase or decrease the speed of the screw motor to increase or decrease heat delivered to the hot viscous plastic in the extruder upon detection of a changed viscosity.

4. The extrusion system according to claim 2, wherein the controller is operative to increase or decrease heat delivered to the hot viscous plastic in the extruder by the at least one heater upon detection of a changed viscosity.

5. The extrusion system according to claim 2, wherein the controller is operative to increase or decrease heat delivered to the hot viscous plastic in the extruder by controlling the movement of a coolant.

6. The extrusion system according to claim 5, wherein the coolant is a liquid coolant introduced to coolant paths in heat transfer proximity to the hot viscous plastic in the extruder.

7. The extrusion system according to claim 5, wherein the coolant is air, the system further comprising a fan under the control of the controller and operative to direct coolant air across the extruder.

8. The extrusion system according to claim 1, wherein the speed sensor is an encoder coupled to a puller to provide an output indicative of the speed of the extrudate being pulled by the puller.

9. The extrusion system according to claim 1, further comprising a gauge operative to measure a cross-sectional dimension of the extrudate.

10. The extrusion system according to claim 9, wherein the extrudate is tubular, the gauge being operative to measure the outside diameter of the extrudate and the controller being operative to maintain the desired inside diameter of the extrudate based upon the measured outside diameter and calculated cross-sectional area.

11. An extrusion control system comprising:

(a) an extruder controller, (b) means for measuring the speed of an extrudate, (c) means for measuring the speed of a gear pump delivering hot viscous plastic to a die, (d) means for controlling at least one of the speed of the extrudate and the speed of the gear pump to thereby control the cross-section of the extrudate, (e) means for measuring the pressure in the hot viscous plastic proximate and upstream of the die as a measure of the pressure drop across the die, and (f) means for controlling heat applied to the hot viscous plastic to control the viscosity of the plastic in the extruder as a function of a viscosity-indicative measure calculated from quantity of hot viscous plastic delivered to the die by the gear pump and pressure drop across the die.

12. The extrusion control system according to claim 11, wherein the means for measuring the speed of the extrudate comprises an encoder coupled to a puller.

13. The extrusion control system according to claim 11 or 12, wherein the means controlling the speed of the extrudate comprises a puller motor under control of the controller.

14. The extrusion control system according to claim 13, wherein the means for measuring the speed of a gear pump comprises an encoder coupled to a gear pump motor.

15. The extrusion control system according to claim 13, wherein the means for controlling heat applied to the hot viscous plastic comprises means for controlling the speed of an extruder screw moving the plastic in the extruder.

16. The extrusion control system according to claim 13, wherein the means for controlling heat applied to the hot viscous plastic comprises means for controlling heaters proximate a path of movement of plastic in the extruder.

17. The extrusion control system according to claim 13, wherein the means for controlling heat applied to the hot viscous plastic comprises the means for delivering a coolant to the extruder.

18. The extrusion control system according to claim 13, wherein the controller comprises programming for (i) calculating the viscosity-indicative measure using the relationship $$Vs = \frac{KP}{V},$$

where Vs is viscosity, P is the pressure drop across the die, V is the volume of hot viscous plastic delivered to the die by the gear pump, and K is a constant, and (ii) calculating cross section area, $$A = \frac{V/t}{N/t},$$

where V/t is the volumetric rate of delivery of the hot viscous plastic by the gear pump, and N/t is the speed of the extrudate.

19. The extrusion control system according to claim 18, further comprising means for measuring a cross-sectional dimension of the extrudate, the controller being operative to control an internal dimension of the extrudate based upon a calculated cross-sectional area of the extrudate and the measured cross-sectional dimension.

20. The extrusion control system according to claim 19, wherein the extrudate is tubular, the measured cross-sectional dimension is outside diameter and the internal dimension is inside diameter.

* * * * *